No. 779,777.

Patented January 10, 1905.

UNITED STATES PATENT OFFICE.

JOHANNES GAEDICKE, OF BERLIN, GERMANY.

PROCESS OF PRODUCING SILVER EMULSIONS.

SPECIFICATION forming part of Letters Patent No. 779,777, dated January 10, 1905.

Application filed August 31, 1904. Serial No. 222,893.

*To all whom it may concern:*

Be it known that I, JOHANNES GAEDICKE, residing at 13 Bendlerstrasse, Berlin, Germany, have invented certain new and useful Improvements in Processes of Producing Silver Emulsions; and I do hereby declare the following to be a full, clear, and exact description of the invention, such as will enable others skilled in the art to which it appertains to make and use the same.

Although emulsions can be produced with different insoluble silver salts and different colloids, yet those made with haloid silver and gelatin are the most important at present for technical purposes. Those emulsions will be taken as an example to explain the process mentioned here.

It is generally known that the gelatin-haloid silver emulsions have been produced up to the present day by adding silver nitrate in a less than equivalent quantity to a watery solution of gelatin and haloid salt and subjecting the emulsion so obtained to a maturing process, which consists of boiling the preparation or adding some ammonia to it and allowing it to digest. When after a certain time preëstablished by experience as necessary for maturing, the emulsion has obtained the desired degree of sensibility—*i. e.*, when it has attained its ordinary maturity—it is made to congeal, is triturated, and then irrigated until all nitrate and all excess of haloid salt is washed away with the water. After that the sensibility is often increased by a few degrees of the sensitometer through supplementary maturing, which consists of adding one drop of ammonia to every one hundred cubic centimeters of emulsion under operation and allowing the preparation to digest for some time. The ammonia remains in the emulsion and partly also in the stratum when dried, being firmly retained by the gelatin; but on account of its prolonged influence not only the sensibility undergoes a change in the course of some months, but also the much-dreaded gray borders put in their appearance on the plates. Moreover, there is no possibility with this process to obtain a preparation the sensibility of which can be preëstablished or will keep uniform in all cases, for the sensibility varies constantly even with the temperature of the atmosphere and is therefore different, according to the time of keeping the emulsion before spreading it or even according to whether a larger or smaller quantity thereof is being spread at a time. Uniformity, however, is of the utmost consequence for technical purposes.

Seeing that during the principal maturing period of the old process the gelatin is strongly attacked, so that often plates are obtained with borders which become wrinkled ore with strata which float off, while no such troublesome influence is experienced during the after-maturation, it appeared advantageous to wash the emulsion before it was fully matured and then allow it to mature completely, and, further, it was thought convenient to bring about this latter process through the mild action of ammonia and afterward to neutralize the ammonia, so as to render it innocuous. That was a proceeding contrary to the old opinion that the sensibility could not be increased to a sufficient degree in the absence of an excess of soluble bromid (see *Eder's Manual*, V edition, Vol. III, page 382;) but this old opinion was found to be erroneous, for on practical investigation the following facts were ascertained:

First. Contrarily to the old opinion, the sensibility can be sufficiently increased in the absence of soluble bromid without fear of disturbance by fog.

Second. The unwashed emulsion containing an excess of bromid and nitrate requires a far larger portion of ammonia to obtain a high degree of sensibility than the washed preparation. The latter requires only one-tenth of the quantity of ammonia to obtain the same sensibility as the former. By this latter quantity of ammonia the gelatin is practically not attacked.

Third. The unripe and washed emulsion, which is free of soluble salts when brought to the highest degree of sensibility by means of digestion with a very small quantity of ammonia, will lose nothing of its sensibility if the ammonia is neutralized afterward or supersaturated with a suitable acid.

Fourth. The ammonia salt formed in this manner may be left in the emulsion without doing any harm.

Fifth. The emulsion prepared in the manner stated under third does not deteriorate with storing for a time or with remelting or while spreading.

Sixth. An emulsion so prepared gives dry plates of excellent permanency which spontaneously never get gray borders and which lose nothing of their sensibility by long storing. This fact has been ascertained in the course of investigations during five years, and such plates were made subject to the tests described in *Eder's Jarhbuch*, 1901, page 392, and in the *Photographisches Wochenblatt*, (*Photographic Weekly Journal*,) 1901, page 313.

Seventh. An emulsion of the above kind is sure to give uniform results at any handling if treated in a uniform manner, as the maturing agent only acts for a certain preëstablished time and is then made ineffective.

On the basis of the above results the following process has been worked out, which is new in so far as the non-matured emulsion has to be washed, while according to the old process the emulsion must be ripe before washing. Thereupon according to the new process the emulsion is digested with ammonia, this latter agent being neutralized when maturity is attained, while up to now if any ammonia has been added sometimes to the ready emulsion to obtain after-maturation it has never been neutralized afterward.

The addition of very small quantities of ammonia and also of soda to the ready emulsion is not new, (*Eder's Manual*, V edition, Vol. III, page 63,) nor is the after-maturation by means of ammonia a new proceeding, (*loc. cit.* page 395;) but in every case mentioned an emulsion of medium sensibility is being started from—*i, e.*, a preparation having undergone the principal maturing process, which is then made rapid by means of after-maturation. If *loc. cit.* page 395 an "unripe" emulsion is mentioned, it must be noted that "unripe" is an indefinite expression and that an emulsion of 10° Scheiner may well be called "unripe" as compared to an extra-rapid emulsion of 16° to 17° Scheiner. In the passage stated the emulsion in question is evidently one of medium sensibility; nor can that passage stand good as a previous publication for this further reason that ammonia with ammonium bromid is proposed therein to obtain the after-maturation.

The neutralization of the ammonia that has served to mature the emulsion is also not new, for it has been resorted to by Belitzki, (*Eder's Jahrbuch*, 1889, page 107;) but Belitzki has neutralized the ammonia after the principal maturing process, which took place in the presence of the soluble bromids and nitrates and before the washing in order to restore to the gelatin its original qualities that had been modified by the ammonia. Thus the new process herein described considerably differs from that of Belitzki, inasmuch as the ammonia is added after the washing, as the principal maturing process takes place when the preparation is practically free of soluble bromids and nitrates and as the ammonia is neutralized afterward and the ammoniacal salt formed thereby is not washed out, but left in the emulsion.

The following is an example of carrying out the new process: Prepare in the manner known an emulsion of gelatin, alkali haloid, and silver nitrate and do not allow the preparation to mature, but get it to congeal before that stage. Triturate the jelly and wash it well. Melt it, then adding as much gelatin, if necessary, as will establish the usual proportion between gelatin and silver haloid and dilute to the twentyfold total weight of the gelatin employed. Heat this emulsion to 40°, add for each liter one to five cubic centimeters of ammonia or any substance producing a similar effect such as triethylamin or any fixed alkali, &c., and allow to digest for one to four hours, according to the degree of sensibility required. Then add a quantity of acid—sulfuric, tartaric, citric, oxalic, &c.—equivalent to the quantity of ammonia, amin, or fixed alkali used before and stir well. If an organic acid is being added, a little more than the equivalent quantity may be used, which will not impair the sensibility and will increase the permanency. The emulsion may now be spread, or it may be made to congeal once more and remelted again in order to obtain a neater cast. Remelting once or even repeated will in no case hurt the sensibility and clearness of the emulsion. In this manner highly sensitive and clear emulsions of very fine grain are obtained.

This process may not only be employed for haloid silver emulsions, but also for such made of other insoluble silver salts, and for other colloids than gelatin.

What I claim is—

1. The process of producing silver-salt emulsions of unchanging sensibility, which consists in first washing a non-matured emulsion, then treating the washed emulsion with an alkali, and finally neutralizing the excess of alkali with an acid.

2. The process of producing silver-salt emulsions of unchanging sensibility, which consists in first washing a non-matured emulsion, then treating the washed emulsion with ammonia, and finally neutralizing the excess of ammonia with sulfuric acid.

In testimony whereof I affix my signature in presence of two witnesses.

JOHANNES GAEDICKE.

Witnesses:
  WOLDEMAR HAUPT,
  WILLIAM MAYNER.